(No Model.)

2 Sheets—Sheet 1.

A. W. COATS.
CAR COUPLING.

No. 263,765.

Patented Sept. 5, 1882.

Witnesses:
Geo. H. Strong.
L. H. Rouse

Inventor
A. W. Coats
By Dewey & Co.
Attorneys (No Model.) 2 Sheets—Sheet 2.
A. W. COATS.
CAR COUPLING.
No. 263,765. Patented Sept. 5, 1882.
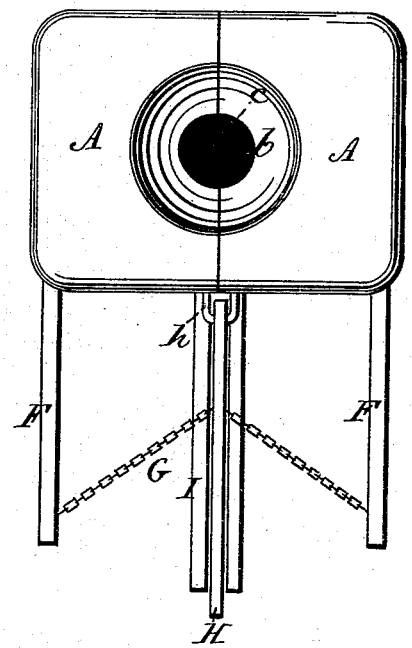
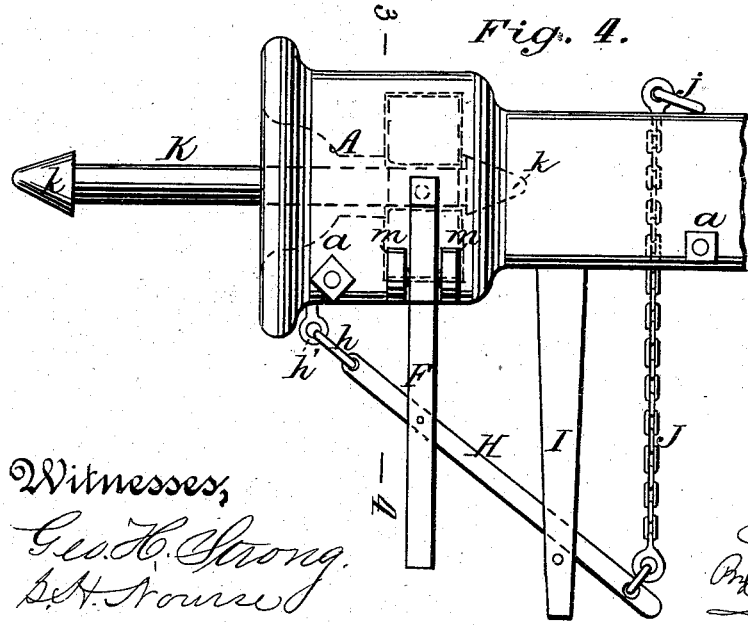

UNITED STATES PATENT OFFICE.

ARTHUR W. COATS, OF YUBA CITY, CALIFORNIA.

CAR-COUPLING.

SPECIFICATION forming part of Letters Patent No. 263,765, dated September 5, 1882.

Application filed July 3, 1882. (No model.)

*To all whom it may concern:*

Be it known that I, ARTHUR W. COATS, of Yuba City, county of Sutter, State of California, have invented an Improved Car-Coupling; and I hereby declare the following to be a full, clear, and exact description thereof.

My invention relates to a new and useful car-coupling, in which peculiar spring-jaws, recessed within the draw-heads, are adapted to receive and close upon a coupling-pin.

My invention consists in a two-part draw-head, recessed in each part of which is a jaw affected by a spring, and having a grooved face adapted to receive the pin, and in connection therewith of a means for releasing the pin from the jaws, consisting of certain connecting-rods and levers hereinafter fully explained.

The object of my invention is to automatically couple cars with efficacy and dispatch, doing away with the dangerous practice of going between the cars in order to couple them.

Figure 1:
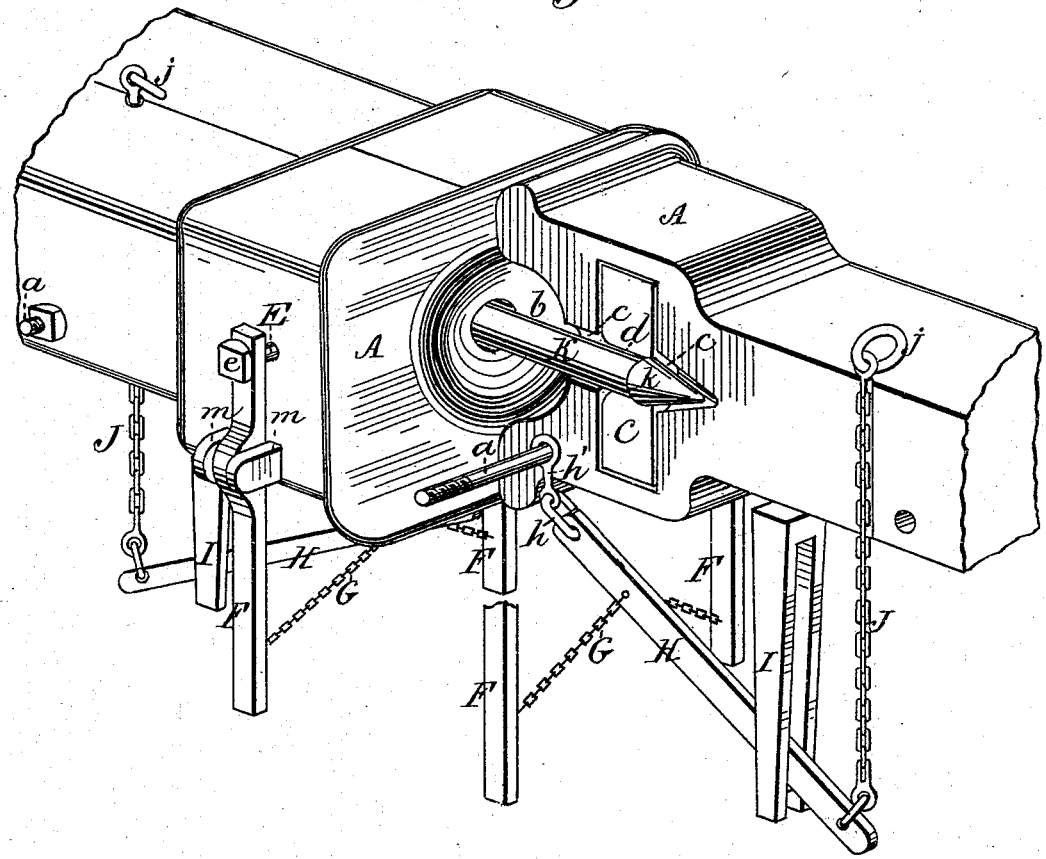
Figure 2:
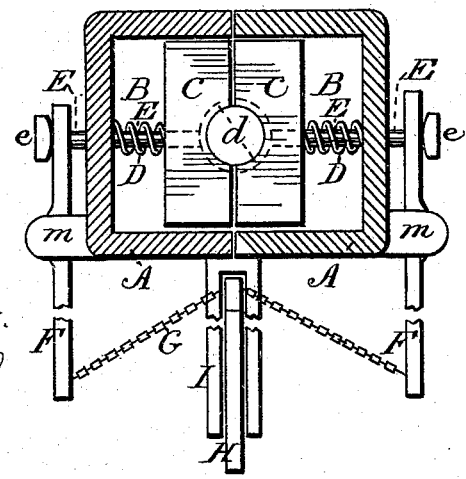

Referring to the accompanying drawings, Figure 1 is a perspective view of my draw-head. Fig. 2 is a vertical section on the line 3 4, Fig. 4. Fig. 3 is a front elevation. Fig. 4 is a side elevation.

Let A represent the draw-head, which is secured to a car in any suitable manner. This draw-head is cast in two pieces, which are held together by suitable bolts, two of which are here represented by *a*. The front of the draw-head has a concaved face, *b*, from which extends backwardly a deep socket, *c*. This socket is crossed at right angles by a chamber, B, in which are the jaws C. These consist of pieces, each occupying about half the chamber B and having semicircular grooves *d* in their faces, which, when brought together, form a circular socket in line with socket *c*. The forward end of the socket formed by the groove *d* is beveled to make it quite as large in diameter as socket *c*, though the rest of it is smaller. The jaws C are held together by springs D behind them. Bolts or rods E pass loosely through the sides of the draw-head and are connected with the jaws C. Upon the projecting ends of these rods are secured by nuts *e* the levers F F, extending downwardly beside the draw-head. They are pivoted on fulcrum-blocks *m*, attached to the sides of the draw-head. Their bottoms are connected by a chain, G.

H is a lever, the forward end of which is connected by a link, *h*, with a hook, *h'*, extending down from the draw-head. This hook is secured between the halves of the draw by one of the cross-bolts *a*. This construction simply shows a means for securing the forward end of the lever to the under side of the draw-head. Any means accomplishing this result would here answer. The chain G is secured to the lever H, as shown, and the rear end of the said lever passes back through a slotted guide, I, under the draw-head, and has attached to it a chain, J. The chain J passes loosely up through the draw-head, and is continued to within reach of the operator, being provided with a suitable handle or a ring, *j*, for convenience in drawing upon it.

The draw-head upon the end of each car is made in the manner described, and has all the operating parts shown.

Let K represent the coupling-pin. This is an ordinary bar provided with arrow-heads K at each end.

The operation of the device is as follows: The coupling-pin, when free of the draw-heads, is first inserted in either one. It is held between the jaws C, and extends from the draw-head. When the cars approach the end of the pin is directed within the concaved face *b* of the other draw-head and enters socket *c*. It forces its way into the grooves *d*, pressing back the jaws C against their springs until its head passes through said grooves, when the jaws come together again, around the shank of the pin, its head being caught by the jaws and held securely in the socket *c* behind the jaws. It cannot be released while the jaws remain closed, as their grooves *d* are too small to permit the passage of the head K.

When it is desired to uncouple the cars the brakeman above draws upward upon one of the chains J. This draws upward the rear end of the lever H, its forward end being secured to the draw-head. The lever draws upward on chain G, thus drawing inward the lower ends of the levers F F. These levers having their fulcrums at *m*, their upper ends are forced out against the nuts *e*, thus drawing outwardly upon rods E, which, being secured to jaws C, draw them apart and free the coupling-pin.

The pin may be uncoupled from either draw-head, and when not in use may remain firmly secured in either.

When in need of repairs or inspection the bolts *a* may be withdrawn and the halves of the draw-head separated to give access to the parts within.

Having thus described my invention, what I claim as new, and desire to secure by Letters Patent, is—

In a car-coupling, the draw-head A, having a concaved face, *b*, and pin-receiving socket *c*, and the jaws C, recessed in said draw-head, having grooves *d* in their faces, and held together by springs D, in combination with the arrow-headed coupling-pin K, fitting said socket *c* and secured by the jaws C, and the means for opening said jaws to release the pin, consisting of the rods E, levers F F, chain G, lever H, and chain J, all arranged and connected as shown, substantially as herein described.

In witness whereof I hereunto set my hand.

ARTHUR WILSON COATS.

Witnesses:
 W. W. COATES,
 H. C. GROVER.